(12) United States Patent
Kuo et al.

(10) Patent No.: US 9,176,337 B2
(45) Date of Patent: Nov. 3, 2015

(54) BACKLIGHT MODULE

(75) Inventors: Yicheng Kuo, Guangdong (CN);
Shihhsiang Chen, Guangdong (CN);
Gang Yu, Guangdong (CN); Gege Zhou,
Guangdong (CN); Jiaqiang Wang,
Guangdong (CN)

(73) Assignee: SHENZHEN CHINA STAR OPTOELECTRONICS TECHNOLOGY CO., LTD., SHENZHEN, GUANGDONG PROVINCE (CN)

( * ) Notice: Subject to any disclaimer, the term of this patent is extended or adjusted under 35 U.S.C. 154(b) by 158 days.

(21) Appl. No.: 13/575,297

(22) PCT Filed: Jun. 5, 2012

(86) PCT No.: PCT/CN2012/076459
§ 371 (c)(1),
(2), (4) Date: Jul. 25, 2012

(87) PCT Pub. No.: WO2013/177805
PCT Pub. Date: Dec. 5, 2013

(65) Prior Publication Data
US 2013/0322118 A1 Dec. 5, 2013

(30) Foreign Application Priority Data
May 30, 2012 (CN) .......................... 2012 1 0174291

(51) Int. Cl.
*F21V 8/00* (2006.01)
*G02F 1/1333* (2006.01)

(52) U.S. Cl.
CPC ........ *G02F 1/133308* (2013.01); *G02B 6/0088* (2013.01); *G02F 2001/133317* (2013.01); *G02F 2001/133328* (2013.01)

(58) Field of Classification Search
CPC ........ G02F 2001/133308; G02F 2001/133317;
G02F 2001/13332; G02F 2001/133314;
G02F 2001/133328; G02F 1/133608; G02F
1/133308; G02B 6/0038; G02B 6/0055;
G02B 6/0021; G02B 6/0043; G02B 6/0046;
G02B 6/0088
USPC ................................ 362/611, 97.1–97.4, 633
See application file for complete search history.

(56) References Cited

U.S. PATENT DOCUMENTS 6,950,154 B2 * 9/2005 Lee ................................. 349/58
7,665,879 B2 * 2/2010 Hsieh ........................... 362/633

(Continued)

FOREIGN PATENT DOCUMENTS

CN 101201488 A 6/2008
CN 101737735 A 6/2010

*Primary Examiner* — Anh Mai
*Assistant Examiner* — Arman B Fallahkhair
(74) *Attorney, Agent, or Firm* — Cheng-Ju Chiang

(57) ABSTRACT

The present invention provides a backlight module, which includes a backplane, a backlight source arranged inside the backplane, a light guide plate arranged inside the backplane, an optic film assembly arranged on the light guide plate, and a split mold frame arranged inside the backplane. The split mold frame includes a plurality of spaced corner pieces respectively set on the optic film assembly. The corner pieces have a support surface that is distant from the optic film assembly for supporting thereon a liquid crystal display panel. The backlight module of the present invention uses an upper surface of a split mold frame to serve as a support surface for a liquid crystal display panel thereby enlarging the supporting area for the liquid crystal display pane, improving supporting stability and also effectively preventing the occurrence of light leakage, ensuring luminance of the backlight module, and enhancing optic grade.

7 Claims, 4 Drawing Sheets

(56) References Cited

U.S. PATENT DOCUMENTS

| | | | |
|---|---|---|---|
| 7,911,775 B2 * | 3/2011 | Azami | 361/679.21 |
| 8,777,439 B2 * | 7/2014 | Kuromizu | 362/97.4 |
| 2008/0143918 A1 * | 6/2008 | Kim | 349/58 |
| 2010/0302717 A1 * | 12/2010 | Oh et al. | 361/679.01 |
| 2011/0292315 A1 * | 12/2011 | Bae et al. | 349/58 |

* cited by examiner

BACKLIGHT MODULE

BACKGROUND OF THE INVENTION

1. Field of the Invention

The present invention relates to the field of liquid crystal displaying, and in particular to a backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal display panel and a backlight module. The working principle of the liquid crystal display panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module for generating images. Since the liquid crystal display panel itself does not emit light, light must be provided by the backlight module in order to normally display images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal display panel to form a planar light source that directly provides lighting to the liquid crystal display panel. The side-edge backlight module arranges a backlight source of LED light bar at an edge of a back panel to be located rearward of one side of the liquid crystal display panel. The LED light bar emits light that enters a light guide plate through a light incident face of the light guide plate and is projected out through a light exit face after being reflected and diffused to further transmit through an optic film assembly to form a planar light source for the liquid crystal display panel.

To support the liquid crystal display panel and to block light leakage, conventional backlight modules are provided with a mold frame. Some conventional designs of mold frame provide a split frame (as shown in FIG. 1). The split mold frame comprises a plurality of corner pieces 200 that is arranged in a spaced form and is mounted to a side plate 102 of a backplane 100. The corner pieces 200 have a cross-section of a lying T-shape. The split mold frame (such as four-corner mold frame) is generally not of sufficient support to a glass substrate due to excessive spacing between the corner pieces 200, whereby the whole glass is not supported in a uniform manner. This leads to local excessiveness of stress, causing a significant influence on the quality of the entire liquid crystal module. Further, the excessive spacing between the corner pieces may also lead to sever leakage of light, which affects the optic grade of the backlight module.

SUMMARY OF THE INVENTION

An object of the present invention is to provide a backlight module, which uses an upper surface of a split mold frame to serve as a support surface for a liquid crystal display panel thereby enlarging the supporting area for the liquid crystal display pane, improving supporting stability and also effectively preventing the occurrence of light leakage, ensuring luminance of the backlight module, and enhancing optic grade.

To achieve the object, the present invention provides a backlight module, which comprises a backplane, a backlight source arranged inside the backplane, a light guide plate arranged inside the backplane, an optic film assembly arranged on the light guide plate, and a split mold frame arranged inside the backplane. The split mold frame comprises a plurality of spaced corner pieces respectively set on the optic film assembly. The corner pieces have a support surface that is distant from the optic film assembly for supporting thereon a liquid crystal display panel.

The backplane comprises a bottom plate and a plurality of side plates connected to the bottom plate. The corner pieces are mounted to the side plates of the backplane.

The corner pieces are respectively arranged at connections between the side plates.

The corner pieces are mounted to the side plates of the backplane by adhesives or screws.

The support surface is an upper surface of the corner pieces that is distant from the optic film assembly.

Each of the corner pieces comprises a first connection member and a second connection member that is perpendicularly connected to the first connection member. The first and second connection members are respectively positioned against inside surfaces of two adjacent ones of the side plates.

The first and second connection members have cross-sections that are rectangular. The corner pieces are of an L-shape. The corner pieces are of identical shape and size.

The corner pieces comprise a retention section formed at a location close to the optic film assembly. The optic film assembly forms a mating section corresponding to the retention section. With engagement established between the retention section and the mating section, the optic film assembly is securely retained on the light guide plate.

The retention section is a projection that projects from a lower surface of the corner piece that is adjacent to the optic film assembly. The mating section is a corresponding hole that is formed in the optic film assembly.

The projection is located at connection between the first and second connection members and shows a cylindrical form. The corresponding hole is a circular through hole. The side plates are of a number of four, and the corner pieces are of a number that is correspondingly four.

The efficacy of the present invention is that the backlight module of the present invention uses an upper surface of a split mold frame to serve as a support surface for a liquid crystal display panel thereby enlarging the supporting area for the liquid crystal display pane, improving supporting stability and also effectively preventing the occurrence of light leakage, ensuring luminance of the backlight module, and enhancing optic grade.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
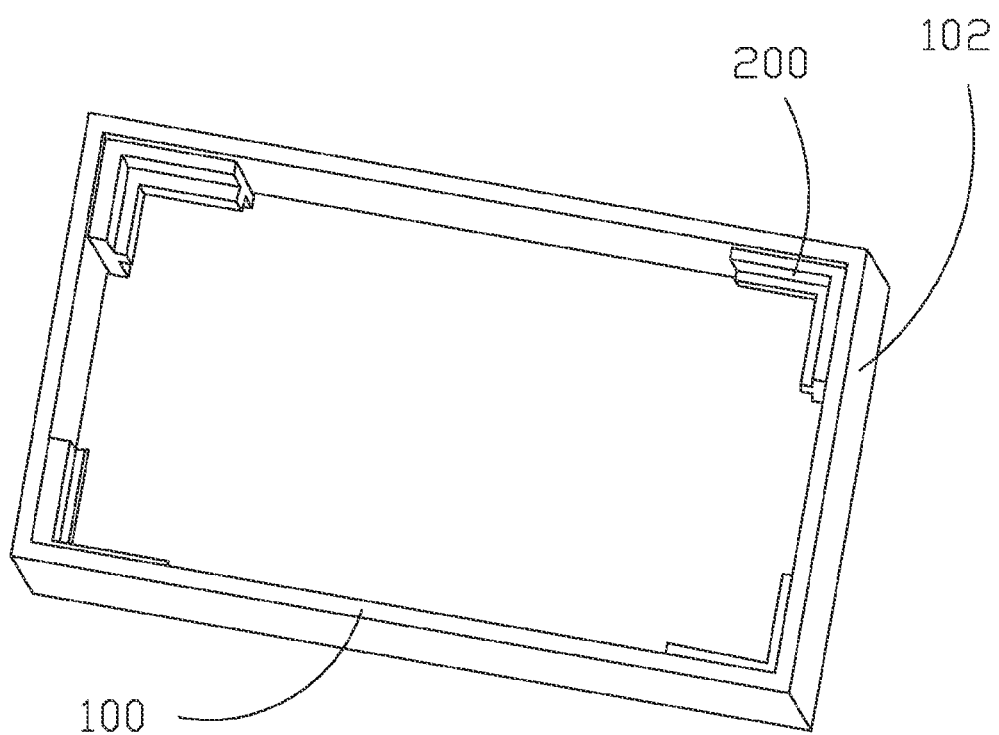
FIG. 1 is a perspective view showing a backlight module that adopts a split mold frame.
Figure 2:
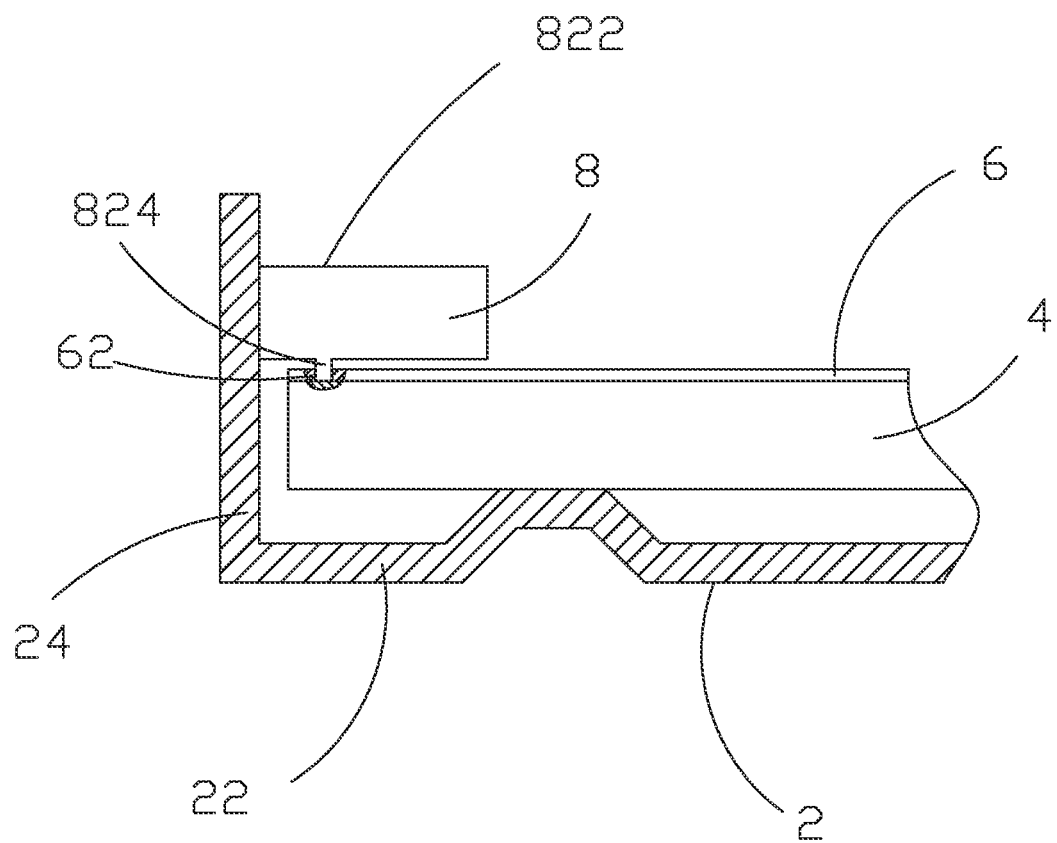
FIG. 2 is a partial cross-sectional view showing a backlight module according to the present invention.
Figure 3:
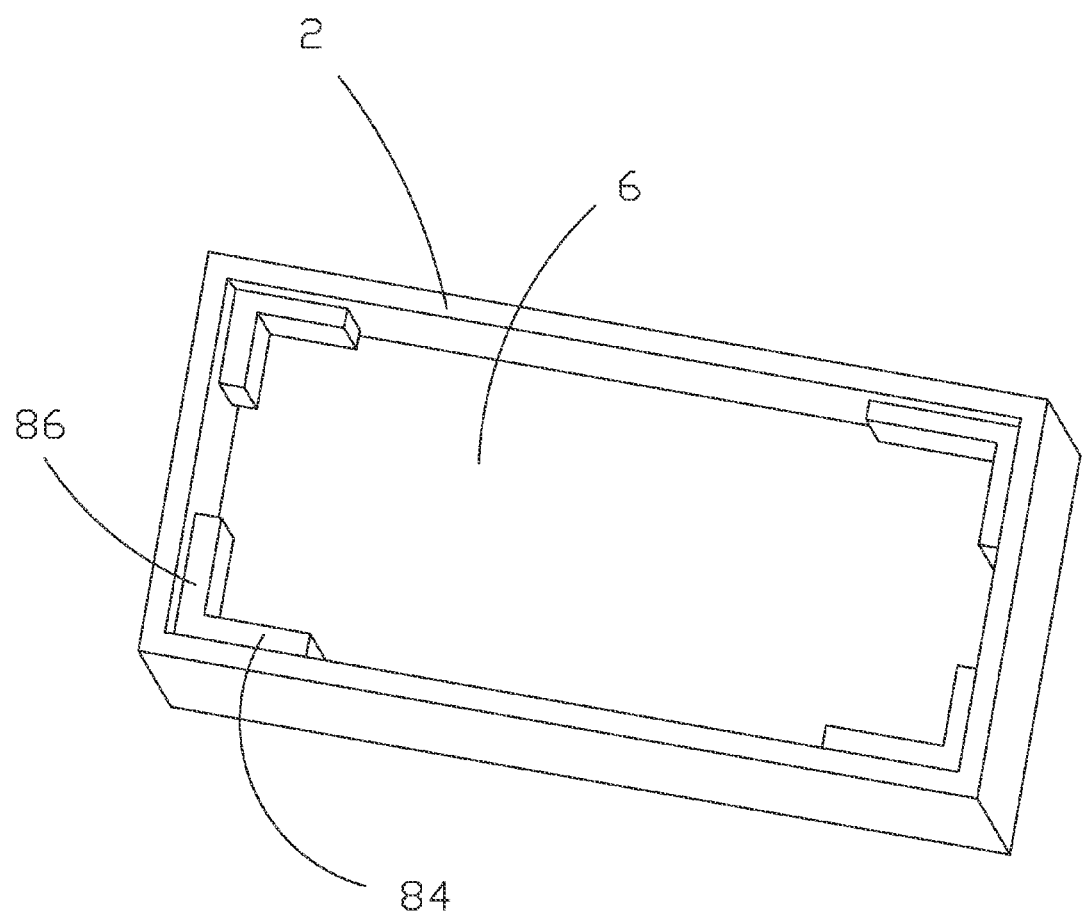
FIG. 3 is a perspective view showing the backlight module according to the present invention.
Figure 4:
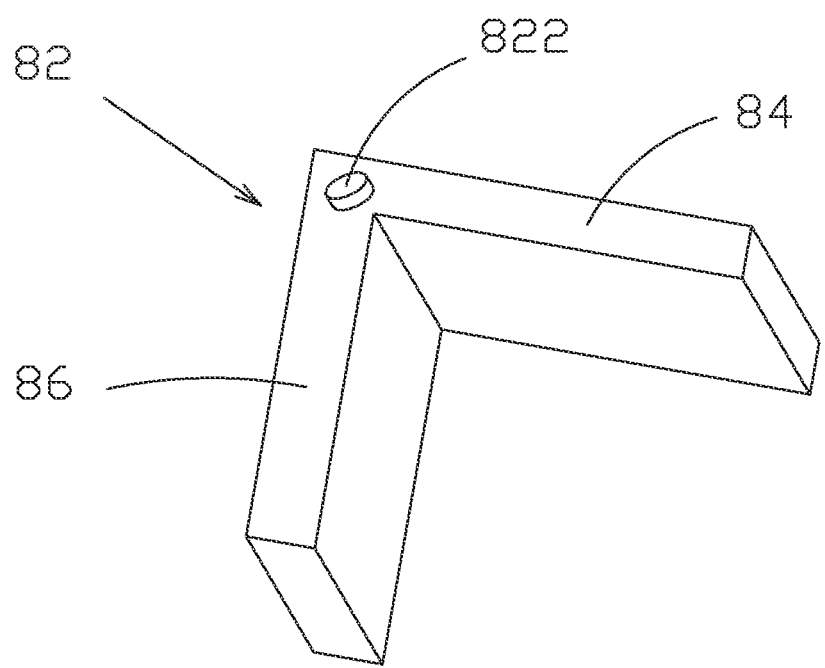
FIG. 4 is a perspective view showing a corner piece of FIG. 3.

Referring to FIGS. 2 and 3-4, the present invention provides a backlight module, which comprises: a backplane 2, a backlight source (not shown) arranged inside the backplane 2, a light guide plate 4 arranged inside the backplane 2, and an optic film assembly 6 arranged on the light guide plate 4, and a split mold frame 8 arranged inside the backplane 2. The split mold frame 8 comprises a plurality of spaced corner pieces 82, which is arranged above the optic film assembly 6.

The backplane 2 comprises a bottom plate 22 and a plurality of side plates 24 connected to the bottom plate 22. The corner pieces 82 are mounted to the side plates 24 of the backplane 2 by adhesives or screws. Preferably, the corner pieces 82 are respectively arranged at connections between the side plates 24. In the instant embodiment, the side plates 24 are of a number of four and the number of the corner pieces 82 is correspondingly four.

Each of the corner pieces 82 comprises a first connection member 84 and a second connection member 86 that is perpendicularly connected to the first connection member 84. The first and second connection members 84, 86 are respectively positioned against inside surfaces of two adjacent side plates 24.

The corner pieces 82 are provided with a support surface 822 that is distant from the optic film assembly 6 for supporting thereon a liquid crystal display panel (not shown). The support surface 822 is an upper surface of the corner pieces 82 that is distant from the optic film assembly 6.

Preferably, the first and second connection members 84, 86 have cross-sections that are both rectangular, so that the cross-sectional of the corner piece is rectangular. The corner piece 82, as a whole, shows an L-shape. In the instant embodiment, the plurality of corner pieces 82 is of identical shape and size. Since the split mold frame 8 according to the present invention does not comprise stop walls in the direction toward the liquid crystal display panel, the problem that a gap is formed by the arrangement of stop wall on the conventional split mold frame 8 in the direction toward the liquid crystal display panel can be eliminated to thereby reducing light leakage occurring in the use of the backlight module and potential risk non-uniform supporting.

The corner pieces 82 are provided with a retention section 824 at a location close to the optic film assembly 6. The optic film assembly 6 forms a mating section 62 corresponding to the retention section 824. With the engagement between the retention section 824 and the mating section 62, the optic film assembly 6 is securely retained on the light guide plate 4. In the instant embodiment, the retention section 824 is a projection that projects from a lower surface 826 of the corner piece 82 that is adjacent to the optic film assembly 6. The mating section 62 is a corresponding hole that is formed in the optic film assembly 6. The projection is engageable with the corresponding hole to thereby fix the optic film assembly 6. Preferably, the projection is located at connection between the first and second connection members 84, 86 and shows a cylindrical form. The corresponding hole is thus a circular through hole.

The backlight module of the present invention uses an upper surface of a split mold frame to serve as a support surface for a liquid crystal display panel thereby enlarging the supporting area for the liquid crystal display pane, improving supporting stability and also effectively preventing the occurrence of light leakage, ensuring luminance of the backlight module, and enhancing optic grade.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising a backplane that comprises a bottom plate and a plurality of side plates connected to the bottom plate, a backlight source arranged inside the backplane, a light guide plate arranged inside the backplane and positioned on the bottom plate of the backplane, an optic film assembly arranged on the light guide plate, and a split mold frame arranged inside the backplane, the split mold frame comprising a plurality of spaced corner pieces respectively set above the light guide plate and the optic film assembly, the corner pieces having a support surface that is distant from the optic film assembly for supporting thereon a liquid crystal display panel;

wherein each of the corner pieces comprises a first connection member and a second connection member that are connected to each other to be substantially perpendicular to each other to define an L-shape and are each a parallelepiped body having a rectangular cross-section that includes substantially parallel side faces of which one is mounted to and supported by an inside surface of a corresponding one of the side plates of the backplane and the other one is distant from and thus not in direct physical contact with the side plate and having a bottommost surface that is located above the optic film assembly and the light guide plate; and wherein each of the corner pieces is supported by the inside surface of the corresponding one of the side plates of the backplane so as to have the bottommost surface spaced from the bottom plate of the backplane and each of the corner pieces comprises a retention section comprising a projection extending downward from the bottommost surface of the one of the parallelepiped bodies of the first and second connection members toward the optic film assembly and having a distal end and the optic film assembly comprises a mating section corresponding to the retention section and comprising a hole formed in the optic film assembly to receive the projection to fit therein so as to securely retain the optic film assembly on the light guide plate, the distal end of the projection of the retention section being in engagement with a surface of the light guide plate so as to have the light guide plate interposed between the distal end of the projection of the retention section and the bottom plate of the backplane.

2. The backlight module as claimed in claim 1, wherein the corner pieces are respectively arranged at connections between the side plates.

3. The backlight module as claimed in claim 1, wherein the corner pieces are mounted to the side plates of the backplane by adhesives or screws.

4. The backlight module as claimed in claim 1, wherein the support surface is an upper surface of the corner pieces that is distant from the optic film assembly.

5. The backlight module as claimed in claim 1, wherein the corner pieces are of identical shape and size.

6. The backlight module as claimed in claim 1, wherein the projection is located at connection between the first and second connection members and shows a cylindrical form and the hole that is formed in the optic film assembly is a circular through hole corresponding to the cylindrical form of the projection.

7. A backlight module, comprising a backplane that comprises a bottom plate and a plurality of side plates connected to the bottom plate, a backlight source arranged inside the backplane, a light guide plate arranged inside the backplane and positioned on the bottom plate of the backplane, an optic film assembly arranged on the light guide plate, and a split mold frame arranged inside the backplane, the split mold frame comprising a plurality of spaced corner pieces respectively set above the light guide plate and the optic film assembly, the corner pieces having a support surface that is distant from the optic film assembly for supporting thereon a liquid crystal display panel;

wherein each of the corner pieces comprises a first connection member and a second connection member that are connected to each other to be substantially perpendicular to each other to define an L-shape and are each a parallelepiped body having a rectangular cross-section that includes substantially parallel side faces of which one is mounted to and supported by an inside surface of a corresponding one of the side plates of the backplane and the other one is distant from and thus not in direct physical contact with the side plate and having a bottommost surface that is located above the optic film assembly and the light guide plate;

wherein each of the corner pieces is supported by the inside surface of the corresponding one of the side plates of the backplane so as to have the bottommost surface spaced from the bottom plate of the backplane and each of the corner pieces comprises a retention section comprising a projection extending downward from the bottommost surface of the one of the parallelepiped bodies of the first and second connection members toward the optic film assembly and having a distal end and the optic film assembly comprises a mating section corresponding to the retention section and comprising a hole formed in the optic film assembly to receive the projection to fit therein so as to securely retain the optic film assembly on the light guide plate, the distal end of the projection of the retention section being in engagement with a surface of the light guide plate so as to have the light guide plate interposed between the distal end of the projection of the retention section and the bottom plate of the backplane;

wherein the corner pieces are respectively arranged at connections between the side plates;

wherein the corner pieces are mounted to the side plates of the backplane by adhesives or screws;

wherein the support surface is an upper surface of the corner pieces that is distant from the optic film assembly;

wherein the corner pieces are of identical shape and size; and wherein the projection of each of the corner pieces is located at connection between the first and second connection members and shows a cylindrical form and the hole that is formed in the optic film assembly is a circular through hole corresponding to the cylindrical form of the projection.

* * * * *